(12) United States Patent
Tiefenauer et al.

(10) Patent No.: US 8,157,901 B2
(45) Date of Patent: Apr. 17, 2012

(54) APPARATUS FOR PURIFYING AIR, IN PARTICULAR FOR VENTILATION AND AIR-CONDITIONING SYSTEMS

(75) Inventors: Kurt Tiefenauer, Dättwil (CH); Theodor Ernst, Baden (CH); Beat Ernst, Wettingen (CH)

(73) Assignee: Lufttechnik+Metallbau AG, Wettingen (CH)

( * ) Notice: Subject to any disclaimer, the term of this patent is extended or adjusted under 35 U.S.C. 154(b) by 850 days.

(21) Appl. No.: 12/161,978

(22) PCT Filed: Jan. 24, 2007

(86) PCT No.: PCT/EP2007/000586
§ 371 (c)(1),
(2), (4) Date: Sep. 3, 2008

(87) PCT Pub. No.: WO2007/085430
PCT Pub. Date: Aug. 2, 2007

(65) Prior Publication Data
US 2009/0084265 A1    Apr. 2, 2009

(30) Foreign Application Priority Data
Jan. 25, 2006    (CH) ...................................... 0129/06

(51) Int. Cl.
*B03C 3/155* (2006.01)
(52) U.S. Cl. ............... 96/55; 55/DIG. 12; 96/39; 96/58; 96/77; 96/94; 96/96
(58) Field of Classification Search .......... 96/55, 57–59, 96/66, 75, 77, 96, 97, 39, 41, 67, 94; 55/DIG. 12
See application file for complete search history.

(56) References Cited

U.S. PATENT DOCUMENTS

| | | | | | |
|---|---|---|---|---|---|
| 4,349,359 | A | * | 9/1982 | Fitch et al. | 96/90 |
| 5,277,704 | A | * | 1/1994 | Miller et al. | 55/321 |
| 5,290,343 | A | * | 3/1994 | Morita et al. | 96/39 |
| 5,433,772 | A | * | 7/1995 | Sikora | 96/87 |
| 5,456,741 | A | * | 10/1995 | Takahara et al. | 96/22 |
| 5,573,577 | A | * | 11/1996 | Joannou | 96/66 |
| 5,622,543 | A | * | 4/1997 | Yang | 96/58 |
| 5,667,563 | A | * | 9/1997 | Silva, Jr. | 96/50 |
| 5,707,428 | A | * | 1/1998 | Feldman et al. | 96/54 |
| 5,846,302 | A | * | 12/1998 | Putro | 96/66 |
| 6,156,104 | A | * | 12/2000 | Jeong | 96/88 |
| 6,679,940 | B1 | * | 1/2004 | Oda | 96/55 |
| 6,749,667 | B2 | * | 6/2004 | Reeves et al. | 95/76 |
| 6,872,238 | B1 | * | 3/2005 | Truce | 95/29 |
| 2004/0118277 | A1 | * | 6/2004 | Kim et al. | 95/57 |
| 2006/0070526 | A1 | * | 4/2006 | Hong et al. | 96/69 |

FOREIGN PATENT DOCUMENTS

| | | | | |
|---|---|---|---|---|
| EP | 0579310 | | * | 1/1994 |
| EP | 1547693 | A | * | 6/2005 |
| FR | 2437877 | A | * | 4/1980 |
| GB | 2265558 | A | * | 10/1993 |
| JP | 4-171064 | A | * | 6/1992 |
| WO | WO 03/095095 | A | * | 11/2003 |

* cited by examiner

*Primary Examiner* — Richard L Chiesa
(74) *Attorney, Agent, or Firm* — Brian Roffe

(57) ABSTRACT

An apparatus for purifying air, in particular for ventilation and air-conditioning systems, has an air filter (11), which is inserted in an air channel (10) or in a filter wall for collecting dust. A dust agglomerator (12) with a DC voltage field is connected directly upstream of the air filter (11). In conventional filters, the efficiency is increased to such an extent that the dust throughput can be approximately halved. In addition, the initial efficiency is only insignificantly reduced during the operating time.

16 Claims, 2 Drawing Sheets

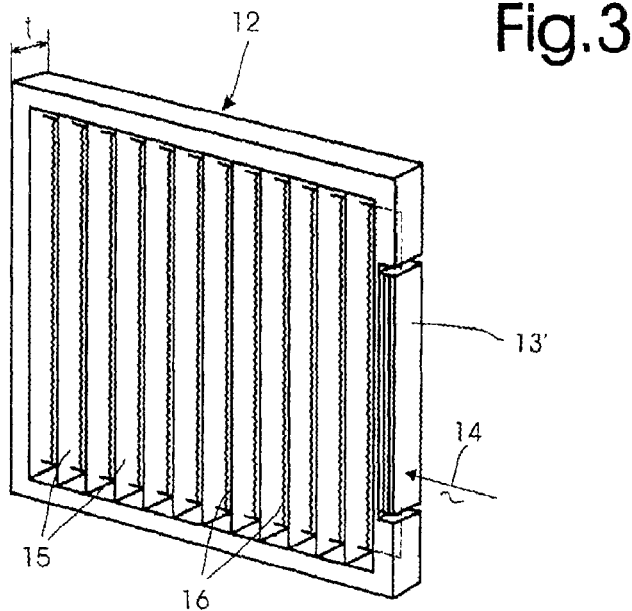
Fig. 3
Fig. 4
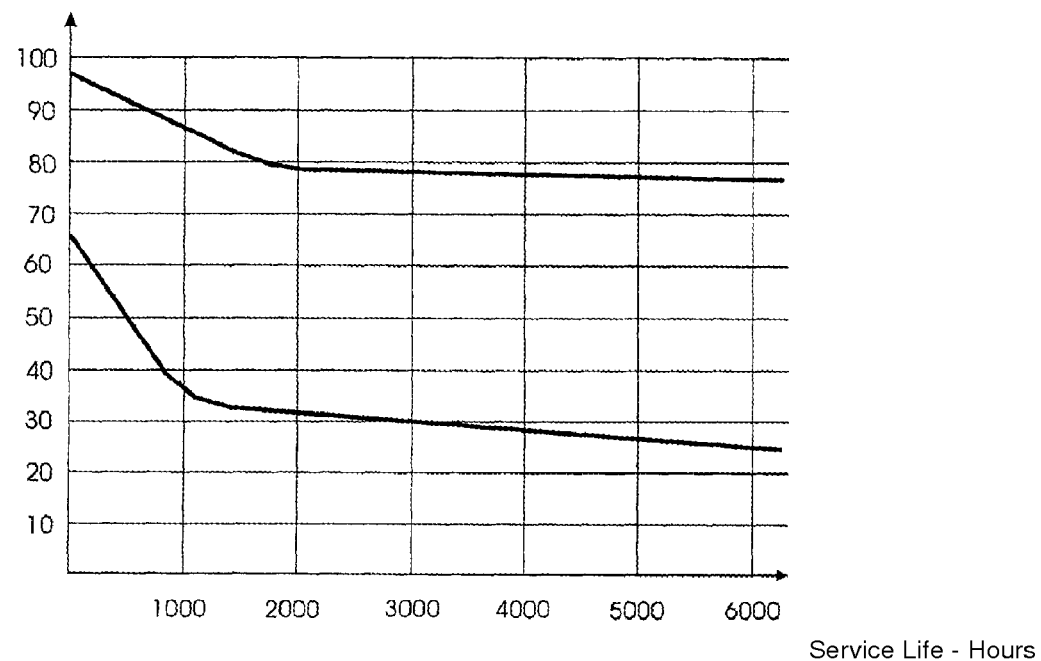
Service Life - Hours

APPARATUS FOR PURIFYING AIR, IN PARTICULAR FOR VENTILATION AND AIR-CONDITIONING SYSTEMS

This application is a National Stage of International Application No. PCT/EP07/00586, filed on Jan. 24, 2007.

The invention concerns an apparatus for purifying air, for ventilation and air-conditioning that has an air filter arranged in an air duct or in a filter wall for dust separation, and a dust agglomerator that is provided with an electric voltage and connected upstream of the air filter.

Air purification systems are generally well known and their significance is constantly deepening with increasing air pollution with particular reference to the fraction of fine particles. According to the degree of efficiency and application they are designed as envelope-type filters, compact filters or sealed filter cells, wherein the envelope-type filters are propagated most widely. The filters are measured in accordance with the European standard EN 779/EN1822 and divided into various air filter classes on account of their degrees of efficiency (microbiological monitoring) or separation efficiency (by weighting). The quality as well as the composition of the filter material utilised, the filter surface in addition to the filter material (glass or synthetic material) govern the properties of a filter in addition to the constructional differences cited.

The pressure loss and consequently the power consumption of the filter system are of crucial significance for operation in addition to the technical data of the filter. The power consumption with filters of similar type and also of similar class may differ from one another considerably. Even if the initial pressure losses in the sales data are mostly still similar to one another, they will become quite divergent from filter type to filter type during service life.

In the case of equipment for air purification according to the brochure U.S. Pat. No. 5,622,543 several filters and plates are arranged in series in an air duct. The air is first passed through a wire-cloth filter and then through a perforated plate, which is designed as an anion generator and for this purpose is able to be connected electrically to a high voltage generator and generates an electromagnetic field. Following this rechargeable plate a dust collector and subsequently an active carbon filter are arranged. Detrimentally the complete arrangement with these several filters and plates exhibits a very low degree of efficiency and as a result this perforated plate having the rhomboid-shaped holes causes such a velocity reduction upon the air flowing through, that the dust particles instead of separating at the next dust collector are separated at this perforated plate and clog the holes therein.

The task underlying the present invention is to create an apparatus of the type cited at the beginning of this specification, with which an increase in the degree of efficiency and a reduction of the decline in the efficiency and an extensive retention of the pressure loss during the whole service life in the case of normal external air conditions is achieved.

This problem is solved by the apparatus according to the invention in which a dust agglomerator includes a number of electrodes and sheet metal plates spaced from one another, in which the electrodes are designed like wires and the sheet metal plates are each alternately arranged and a voltage, in particular a DC electric field is able to be generated with the electrodes.

In accordance with the invention the degree of efficiency is raised in the case of a specific filter such that the dust penetration may be approximately halved. Additionally the initial efficiency during a normal service life (e.g., 6,000 hours) drops only insignificantly, which provides the operator with a crucial assurance and this with only a negligible increase in the pressure loss. The power costs may thus be maintained constant and low.

The increase in air filter effectiveness is customarily solved in an industry sector by the selection of a finer filter media. However finer denser filter media exhibit a higher air resistance (pressure loss), which rises considerably moreover during the service life, and as a result power costs increase. The dust agglomerator according to the invention connected immediately upstream of the air filter enlarges the fine dust carried by the air by agglomeration such that it may separated more effectively with a simple air filter. The dust is preconditioned by the agglomerator.

Unlike the conventional electro-filters the object of the invention possesses only one single d.c. high voltage field, which enlarges the dust particles by ionisation and subsequent agglomeration, wherein the dust is separated to a greater degree in the downstream connected air filter of the customary industry sector design.

The separated dust particles of which the majority have been charged homopolarly moreover form an electrostatically active surface in the air filter, which intensifies the dust attachment and at the same time reduces the undesired shedding (detachment).

In comparison to this in the case of conventional air filters having no dust agglomerator the electrostatic charge generated when fabricating the medium remains effective only until the electric charge is removed and thus neutralised. This happens as early as a few days or weeks (from removing the charge).

In the case of the apparatus according to the invention the agglomerator effect is constantly renewed thanks to the electrostatic field and the degree of separation survives to a great extent at the original high level during the service life. This effect materialises with glass fibres and synthetic filter media alike.

The dust particles present in the air are converted in the dust agglomerator to larger, reduced quantity dust particles, which can be separated more effectively. Consequently the filter medium does not need to be designed to be so close-meshed, which means less pressure loss and consequently lower power consumption. In other words, the same purification effectiveness may be achieved with an "inferior" filter. Economic efficiency calculations will include the additional power consumption for the high voltage rectifier.

The apparatus is also extremely well suited to the cost effective retrofitting of existing filter systems to a higher degree of efficiency without having to replace the fans and drive motors owing to the greater pressure losses required.

The apparatus eliminates also the inherent disadvantage of the traditional electro-filters, wherein any separation effect of the electro-filter becomes inapplicable with loss of power. In the case of the apparatus according to the invention however the normal degree of separation of fabric filters will survive a loss of power.

The invention will now be described in greater detail with the aid of the diagrams:

FIG. 3 is an embodiment of a dust agglomerator having an integrated high voltage rectifier; and FIG. 4 is a diagram comparing the degree of efficiency of an apparatus according to the invention with that of a conventional air filter.

Figure 1:
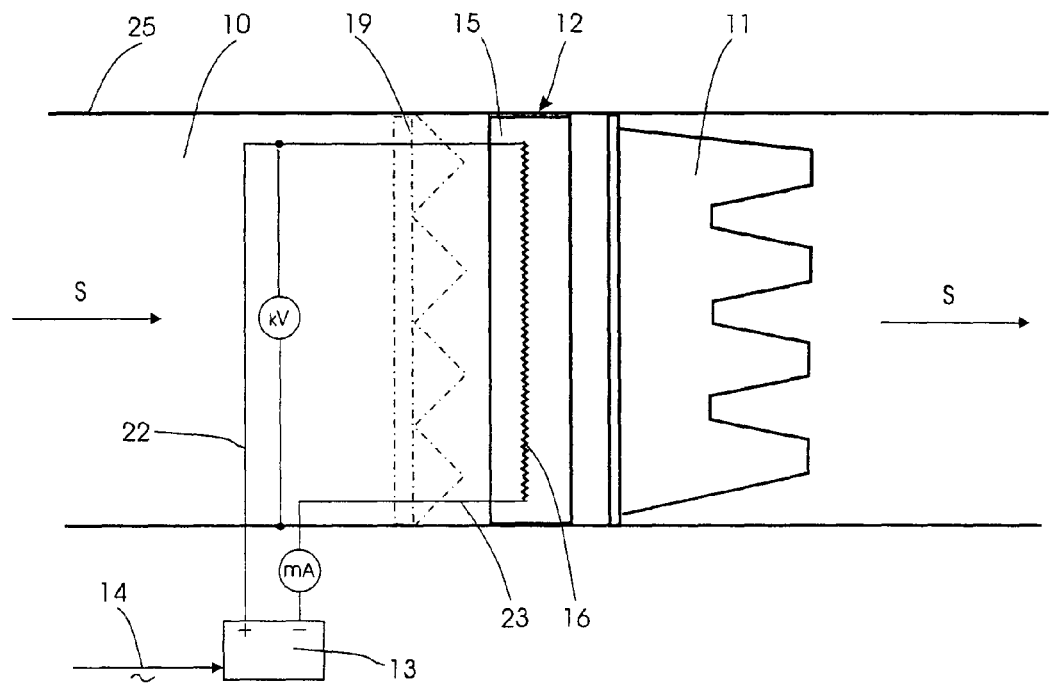
FIG. 1 is a diagram of an apparatus for air purification according to the invention.

FIG. 1 shows an apparatus for purifying air schematically, in particular for ventilation and air-conditioning systems, which is mounted in an air duct 10 formed by a channel enclosure 25, through which the air to be purified is conveyed in the flow direction S. As an example it is in fact a normal air duct for a filter cell, which typically exhibits a cross-section of 610×610 mm. The air flow may be for example 2700 m³/h or 3400 m³/h, which corresponds to an air velocity in the duct of 2 m/s and 2.5 m/s respectively.

An air filter 11 is assigned to this apparatus in the air duct 10, which serves to separate dust particles present in the air. At the same time it constitutes an envelope-type or compact filter, such as are available on the market in various air filter classes. As a rule such air filters consist of a close-meshed synthetic fabric.

Figure 2:
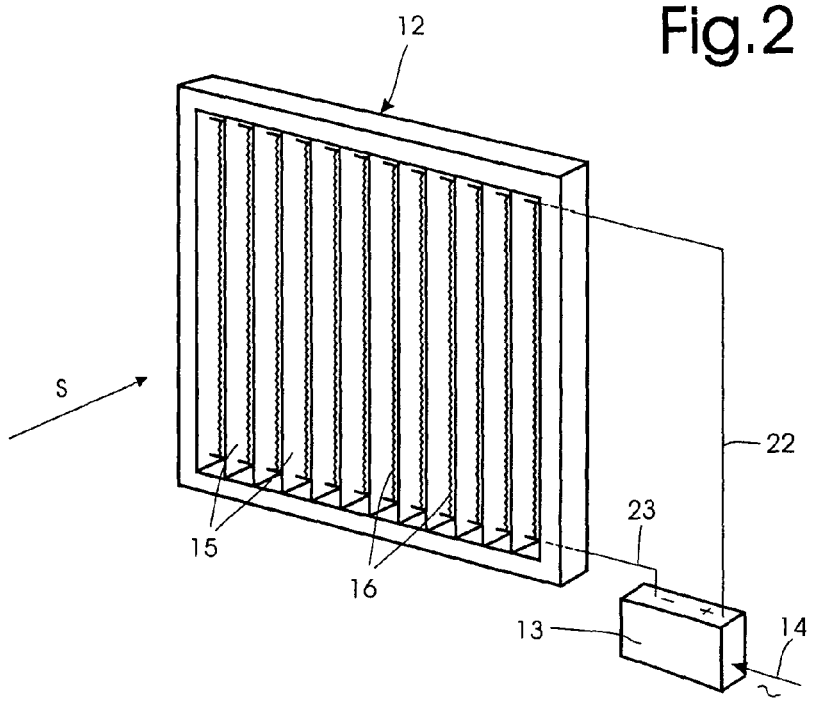
FIG. 2 is an embodiment of a dust agglomerator for the apparatus according to the invention.

A dust agglomerator 12 is connected immediately up-stream of the air filter 11, which is also shown simplified in FIG. 2. The dust agglomerator 12 exhibits a number of electrodes 16 and sheet metal plates 15 spaced apart from one another, in which the wire-like electrodes 16 and the sheet metal plates 15 are each arranged alternately and an electric field, in particular a d.c. electric field, is able to be produced with the electrodes 16 in the air duct.

The electrodes 16 and sheet metal plates 15 are in series in the frame-shaped dust agglomerator 12 arranged in a transverse orientation to the air duct 10. The sheet metal plates 15 at this point run with their longitudinal section in air-flow direction S and they are arranged to run parallel to one another together with the electrodes advantageously spaced at an equal distance apart, in which the electrodes 16 are positioned approximately in the centre region of the sheet metal plates 15. Preferably they may be designed as a wire electrode from tungsten or another special steel, which run in the longitudinal direction to the rectangular plates 15 (counter electrodes). The electrodes could also be designed to be undulating and consequently are tensible like a spring in the dust agglomerator.

The electrodes 16 are connected to a high voltage rectifier 13 to generate the d.c. electric field via the connecting cables 22, 23, and this is connected to the mains supply on one side via a cable 14. The voltage of the high voltage rectifier 13 for example may lie between 5 kV and 12 kV.

In accordance with FIG. 3 the high voltage rectifier 13' may also be integrated directly with the dust agglomerator 12, so that both of these are able to be replaced as a single assembly and consequently only just one plug-in connector must be present to supply the power for this rectifier (e.g., 230 V arc.)

This high voltage rectifier 13' is dimensioned so that it does not protrude from the agglomerator frame 12, so that the frame fabricated in standard size can be inserted in an appropriately standardised duct, without this duct having to be specially adapted.

The frame-shaped dust agglomerator 12 is designed as a plug-in module and able to be fixed transversely in the duct enclosure 25 in front of the air filter 11 arranged parallel to it. It may also be bracket-mounted directly to the filter frame or the filter or fastened to it and be incorporated or developed as a combined unit in a system. Through optimisation of the design the depth t of the dust agglomerator 12 may be kept low enough to be able to retro-equip existing air conditioning equipment or systems with it (the agglomerator). The depth of such an agglomerator 12 lies preferably between 40 and 60 mm. Also the distances of the electrodes to the plates are chosen so that optimum ratios relating to the air resistance of the agglomerator 12, to the electrostatic charge with the filter and to the electrostatic influence of the dust ensue. Preferably a spacing of 10 to 50 mm is provided between the electrodes and the plates. The plates could also be designed basically almost like a wire.

Advantageously, a preliminary filter 19 shown as dot-dash lines is connected up-stream of the dust agglomerator, which may be provided equally as a commercially available filter. This preliminary filter 19 is preferably designed with a coarse mesh, so that it only has to protect the agglomerator 12 from coarse dust particles (insects or similar).

The dust agglomerator connected to the high voltage rectifier 13 (or in the case of large systems to a common d.c. voltage source) possesses a single d.c. electric field, so that no dust separation takes place in the agglomerator. The air is ionised and the dust is only collected in the air filter 11 connected down-stream of the dust agglomerator. The dust particles having the majority charged homopolarly form an electrostatically active surface in the air filter 11, which intensifies the dust attachment additionally. This is then also particularly effective if the air to be purified contains liquid droplets, for example oil particles, which are separated from the air more effectively with the apparatus according to the invention.

Whereas in the case of conventional filter apparatus having no dust agglomerator, the electrostatic charge was only effective for such periods until the filter fabric fibres had become clogged with dust or the charge was neutralised, whereby the initial high degree of efficiency is explained, the electric field is continually present in the case of the apparatus according to the invention, and the degree of efficiency remains in practice at the initial high level during the service life, as is evident from the diagram in FIG. 4. The diagram shows the principal characteristics as an example dependent upon service life and in relation to a dust diameter of at least 0.4 μm. In the case of an apparatus having a dust agglomerator according to the invention when employing an envelope-type filter class F7 with a synthetic medium, the degree of efficiency may be sustained permanently at approximately 80%, whereas when employing just an envelope-type filter a degree of efficiency results, which falls to less than 30%.

The dust particles present in the air are converted in the dust agglomerator 12 to larger, but reduced quantity dust particles, which can be effectively separated. The air filter 11 does not have to have such a close mesh, which also means lower pressure loss with a defined degree of efficiency. In other words, the same purification outcome may be achieved with an "inferior" filter, or the same filter is suitable for more compact solutions (having shorter air filters)

The apparatus according to the invention is more favourable economically than conventional air purification apparatus having a comparable degree of efficiency, in spite of the need for additional electric power for the dust agglomerator, since the systems with filters of a lower class and hence lower pressure loss (power consumption and costs of acquisition) may be equipped.

It is not only of importance for ventilation and air conditioning systems, but also for technical, industrial purposes such as in the clean room technology, or for filter applications in the pharmaceutical industry or in the nuclear industry.

The use of agglomerators proves itself particularly in the submicron particle sector, where the Brownian motion of molecules is effective. The Brownian motion is intensified by the field energy supplied (kinematic coagulation), which is why the apparatus according to the invention finds application particularly in the submicron respirable dust sector and in the nano-technology applications.

It should be reiterated at this juncture, that agglomerators according to the invention may be connected up-stream, even (upstream of) the filter cells of entire filter walls in the case of large systems.

The invention claimed is:

1. A ventilation and air conditioning system with an air purification apparatus, comprising:
   a channel enclosure defining an air duct of the ventilation and air conditioning system through which air to be purified flows in an air-flow direction;
   an air filter arranged in the air duct or in a filter wall for dust separation; and
   a dust agglomerator arranged in the air duct and connected upstream of the air filter or the filter wall,
   wherein the dust agglomerator comprises a number of wire electrodes and sheet metal plates spaced from one another, in which the electrodes and the sheet metal plates are each alternately arranged and a direct current (DC) voltage field is able to be generated with the electrodes, and
   wherein the dust agglomerator is situated in the air duct transverse to the air-flow direction and arranged parallel to the air filter or filter wall,
   wherein the dust agglomerator is designed as a plug-in module and is fixed transversely to the channel enclosure,
   wherein a direct current (DC) rectifier is able to be employed to generate the direct current voltage field,
   wherein the DC rectifier is integrated directly into a frame of the dust agglomerator, and
   wherein the dust agglomerator in the form of a plug-in module is fastened directly to a frame of the filter or to the filter and is able to be assembled into the channel enclosure as a common unit.

2. Apparatus according to claim 1, wherein the electrodes and sheet metal plates are arranged in series in the dust agglomerator and wherein this is oriented transversely to the air duct.

3. Apparatus according to claim 1, wherein the sheet metal plates have their longitudinal section running in the air-flow direction.

4. Apparatus according to claim 1, wherein the electrodes and the sheet metal plates are arranged respectively in an equal spacing running parallel to one another, in which the electrodes are positioned approximately in a center region of the sheet metal plates.

5. Apparatus according to claim 1, wherein the electrodes consist of tungsten.

6. Apparatus according to claim 1, wherein each of the electrodes consists of a slender thin sheet metal strip.

7. Apparatus according to claim 1, wherein the electrodes are designed to be undulating and are tensible.

8. Apparatus according to claim 1, wherein the dust agglomerator has a depth of between 40 and 50 mm, so that it is suitable for being retro-fitted to an existing system.

9. Apparatus according to claim 1, wherein a voltage of the DC rectifier lies between 5 kV and 15 kV.

10. Apparatus according to claim 1, wherein a preliminary filter is fitted directly in front of the dust agglomerator which is arranged to be immediately in front of the corresponding filter.

11. Apparatus according to claim 1, wherein the air filter is an envelope filter.

12. Apparatus according to claim 1, wherein the air filter is a compact filter.

13. Apparatus according to claim 1, wherein the air filter comprises a meshed fabric.

14. Apparatus according to claim 1, wherein the air filter comprises a meshed synthetic fabric.

15. Apparatus according to claim 1, wherein the air filter immediately follows the dust agglomerator in the air duct defined by the channel enclosure.

16. A ventilation and air conditioning system, comprising:
    a channel enclosure defining an air duct through which air to be purified flows in an air-flow direction; and
    an air purification apparatus arranged in the air duct,
    said air purification apparatus comprising:
       an air filter that separates dust from the air; and
       a dust agglomerator arranged upstream of the air filter, the dust agglomerator comprising wire electrodes and sheet metal plates spaced from one another, in which the electrodes and the sheet metal plates are alternately arranged and a direct current (DC) voltage field is able to be generated with the electrodes, and the dust agglomerator is situated in the air duct transverse to the air-flow direction and arranged parallel to the air filter,
    wherein the dust agglomerator is designed as a plug-in module and is fixed transversely to the channel enclosure,
    wherein a direct current (DC) rectifier is able to be employed to generate the direct current voltage field,
    wherein the DC rectifier is integrated directly into a frame of the dust agglomerator, and
    wherein the dust agglomerator in the form of a plug-in module is fastened directly to a frame of the filter or to the filter and is able to be assembled into the channel enclosure as a common unit.

* * * * *